United States Patent
Hill et al.

(10) Patent No.: US 11,422,326 B2
(45) Date of Patent: Aug. 23, 2022

(54) BACKPLATE FOR AN OPTICAL FIBER ENCLOSURE

(71) Applicant: Clearfield, Inc., Minneapolis, MN (US)

(72) Inventors: John P. Hill, Oak Grove, MN (US); Joshua J. Povlitzki, Otsego, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/153,477

(22) Filed: Jan. 20, 2021

(65) Prior Publication Data
US 2021/0223492 A1    Jul. 22, 2021

Related U.S. Application Data

(60) Provisional application No. 62/963,581, filed on Jan. 21, 2020.

(51) Int. Cl.
*G02B 6/44*    (2006.01)

(52) U.S. Cl.
CPC .......... *G02B 6/4441* (2013.01); *G02B 6/4457* (2013.01)

(58) Field of Classification Search
CPC ............................ G02B 6/4441; G02B 6/4446
See application file for complete search history.

(56) References Cited

U.S. PATENT DOCUMENTS

| 7,000,863 | B2 * | 2/2006 | Bethea ................. | G02B 6/4457 242/388.6 |
| 10,488,612 | B2 * | 11/2019 | Gonzalez Covarrubias ................ | G02B 6/4453 |
| 2002/0172489 | A1 * | 11/2002 | Daoud ................. | G02B 6/4457 385/135 |
| 2011/0158599 | A1 * | 6/2011 | Kowalczyk .......... | G02B 6/4457 385/135 |
| 2018/0120526 | A1 * | 5/2018 | Hill ........................ | G02B 6/445 |

* cited by examiner

*Primary Examiner* — Charlie Y Peng
(74) *Attorney, Agent, or Firm* — Troutman Pepper Hamilton Sanders LLP

(57) ABSTRACT

An optical fiber enclosure has a housing having a mounting wall within a storage space. The enclosure also has a backplate attached to the mounting wall, the backplate having a mounting surface and a circumferential wall for receiving cable slack. The optical fiber enclosure also has a spindle attached to the mounting surface of the backplate, the spindle configured to connect to a cable spool configured to rotate relative to the spindle and the backplate to store optical fiber.

14 Claims, 10 Drawing Sheets

BACKPLATE FOR AN OPTICAL FIBER ENCLOSURE

CROSS REFERENCE TO RELATED APPLICATION

The present application claims benefit of priority under 35 U.S.C. 119(e) to the filing date of U.S. Provisional Patent Application 62/963,581, filed on Jan. 21, 2020, entitled, "Backplate For An Optical Fiber Enclosure," the contents of which are incorporated herein by reference in their entirety.

TECHNICAL FIELD

The present disclosure relates generally to optical fiber enclosures, and more particularly to a backplate for an optical fiber enclosure.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. Optical fiber enclosures are used for management of cables that extend to various user locations.

SUMMARY

The present disclosure is not limited in terms of the particular embodiments described in this application, which are intended as illustrations of various aspects. Many modifications and variations can be made without departing from its spirit and scope, as will be apparent to those skilled in the art.

According to one aspect, there is disclosed an optical fiber enclosure including a housing having a mounting wall within a storage space. The enclosure also includes a backplate attached to the mounting wall, the backplate including a mounting surface and a circumferential wall for receiving cable slack. The optical fiber enclosure also includes a spindle attached to the mounting surface of the backplate, the spindle configured to connect to a cable spool configured to rotate relative to the spindle and the backplate to store optical fiber.

In some embodiments, the backplate may comprise a cylindrical base comprising the mounting surface and the circumferential wall. The backplate may further comprise one or more accessory holders extending away from the cylindrical base. The one or more accessory holders may comprise a sleeve holder and an adapter holder. In some embodiments, the backplate may further comprise a first accessory holder extending away from the cylindrical base at a first radial location and a second accessory holder extending away from the cylindrical base at a second radial location. In some embodiments, the first radial location and the second radial location may be separated from each other by 180 degrees. In some embodiments, the backplate may further comprise a plurality of protrusions extending from the cylindrical base, the plurality of protrusions retaining a cable slack wrapped around the circumferential wall. In some embodiments, the plurality of protrusions may be coplanar with the mounting surface. In some embodiments, the cylindrical base may further comprise a plurality of first attachment features for mating with second attachment features on the mounting wall of the housing. In some embodiments, the first attachment features may be receptacles or mounting clips and the second attachment features may be receptacles or mounting clips.

In some embodiments, the optical fiber enclosure may comprise more first mounting features than second mounting features. The first mounting features may be spaced at different radial locations along the circumferential wall. In some embodiments, the Backplate may be configured to be mounted in a plurality of orientations within the housing via a selected two of the first attachment features and the second attachment features.

In some embodiments, the optical fiber enclosure may further comprise a hinged cover for closing the storage space. In some embodiments, the optical fiber enclosure may further comprise the cable spool mounted to the spindle.

DETAILED DESCRIPTION

Aspects of the present disclosure are directed at optical fiber enclosures that provide slack fiber storage. Embodiments of the optical fiber enclosures may be configured for use as a wall box at various user locations, for example, at multi-dwelling units, single family units, cellular towers and business class services.

Embodiments of the optical fiber enclosure may be configured to accept a variety of drop cables, which allows the enclosure to be integrated into any network architecture and deployment.

Various embodiments of optical fiber enclosures disclosed herein simplify fiber deployment. For example, the distance to a user location may be unknown. Embodiments of optical fiber enclosures may include a spool configured to allow optical fiber cable to be pulled out of the enclosure to a desired length, and any slack storage may be held in the spool. Thus, various embodiments eliminate the need for exact fiber cable lengths, and protect excess fiber by storing it on the spool. Various embodiments of the optical fiber enclosures may have a built-in feature that locks the spool in place once the optical fiber has been pulled to the specified location.

Disclosed embodiments further include a backplate configured to be attached to a portion of the optical fiber enclosure to promote ease of attachment of a cable spool and slack storage, as well as arrangement and mounting of additional cable routing features, such as a connector, adapter, sleeve, etc. The backplate may include a multi-position configuration such that the backplate may be mounted in different orientations within an enclosure depending on the desired cable storage, slack, and deployment configuration.

Figure 1:
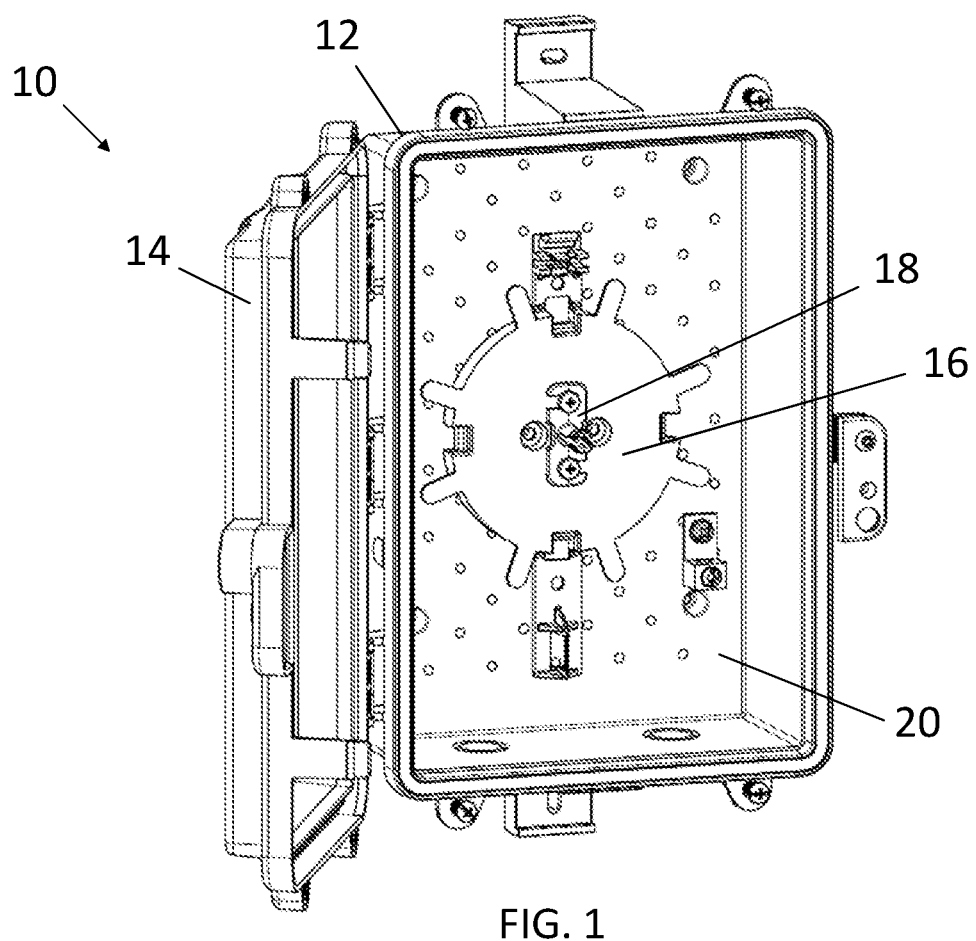
FIG. 1 is a perspective view of one embodiment of an enclosure including a backplate configured according to aspects of the present disclosure.

FIG. 1 shows one embodiment of an enclosure 10. The enclosure 10 includes a housing 12 defining a storage space. In this embodiment, the housing 12 is a rectangular wall box. In other embodiments, the housing 12 may have a different shape. The housing 12 may be connected to a hinged cover 14 for closing the enclosure 10. The enclosure 10 includes a backplate 16 and a spindle 18. The backplate 16 is configured to be mounted to a mounting wall 20 of the housing 12 (e.g., via one or more fasteners, clips, etc.) within the storage space. The spindle 18 is configured to be mounted to the backplate 16 and support a cable spool storing a length of cable, such as drop cables for a network architecture deployment.

Figure 2:
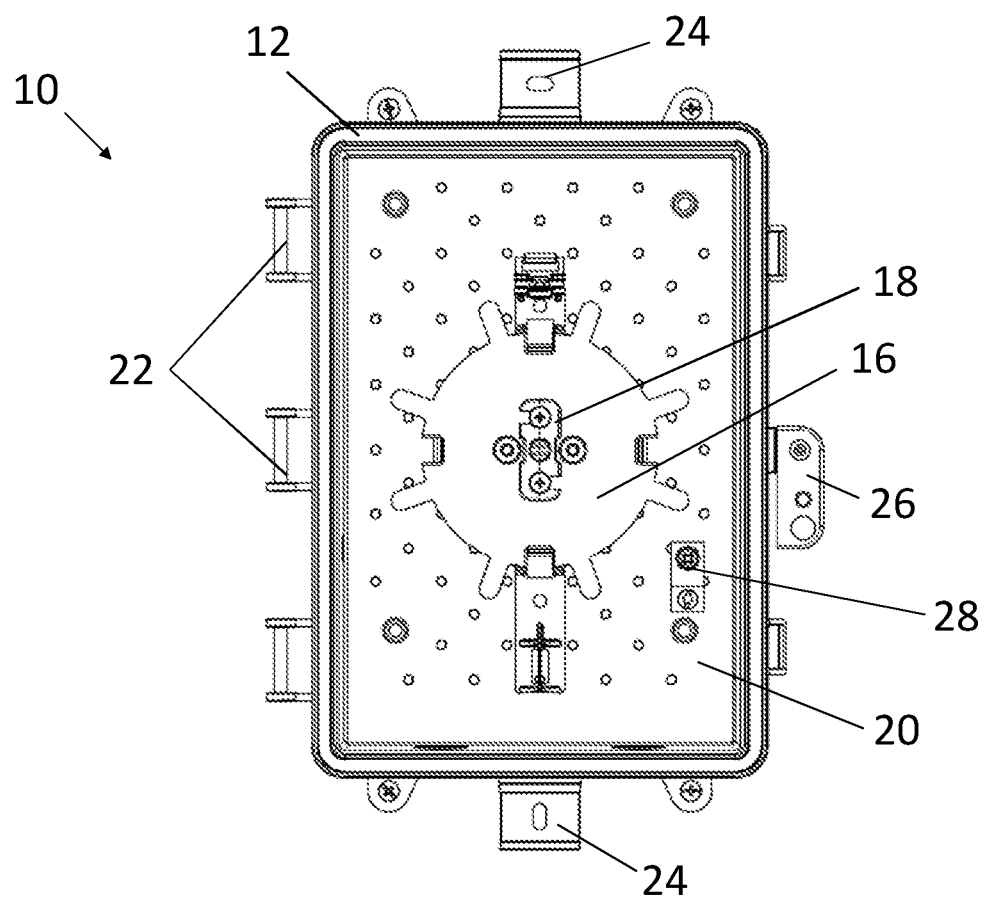
FIG. 2 is a front view of the enclosure, including the backplate, according to aspects of the present disclosure.

FIG. 2 is a front view of the housing 12 including the backplate 16 mounted to the mounting wall 20 and the spindle 18 mounted to the backplate. The housing 12 may further include hinges 22 for connected to the cover 14, mounts 24 for mounting the enclosure 10 to a wall or other support structure, and a closure mechanism 26 for securing the cover 14 to the housing 12 at a free end of the cover 14. A grounding mount 28 may also be connected to the mounting wall 20 for providing a grounding location for a cable held in the enclosure 10. The housing 12 of the enclosure 10 may further include entry/exit ports for a stored cable.

Figure 3:
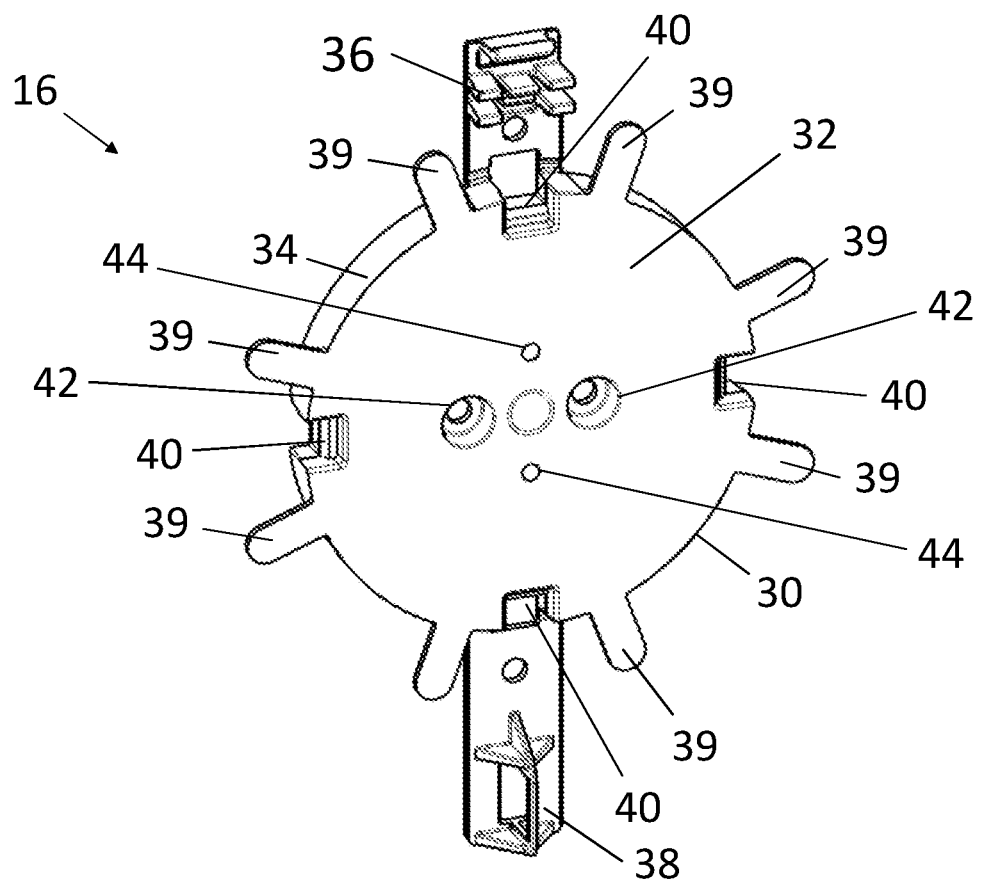
FIG. 3 is a perspective view of the backplate of FIGS. 1-2, according to aspects of the present disclosure.

FIG. 3 is a perspective view of the backplate 16, according to an exemplary embodiment. The backplate 16 includes a base 30 in a cylindrical shape having a mounting surface 32 and a circumferential wall 34 surrounding the mounting surface 32. One or more accessory holders may extend from the base 30, such as a sleeve holder 36 and an adapter holder 38. In an exemplary embodiment, the accessory holders extend along a radius of the base 30 away from the circumferential wall 34. In the depicted embodiment, the sleeve holder 36 and the adapter holder 38 extend away from the base 30 at opposite sides of the base 30 (e.g., 180 degrees from each other). It should be understood, however, that the accessory holders may extend away from the base 30 at any angle and at any spacing to each other, depending on the relevant storage, slack, and deployment requirements. The backplate 16 may further include a plurality of protrusions 39 extending at various spaced locations away from the base 30 at the mounting surface 32 to form hold-backs for cable slack that may be wrapped around the circumferential wall 34.

As shown, the circumferential wall 34 may create a depth to the base 30 such that the mounting surface 32 is spaced from the mounting wall 20 in use, while the structure of the sleeve holder 36 and adapter holder 38 are formed opposite the mounting surface 32 such that these elements contact the mounting wall 20 of the housing 12. The protrusions 39 may be coplanar with the mounting surface 32 such that any cable slack may be held between the protrusions 39 and the mounting wall 20.

The base 30 may further include features for mounting the backplate 16 to the mounting wall 20 of the housing 12. For instance, the base 30 may include a plurality of receptacles 40 for receiving mating components on the mounting wall 20. The receptacles 40, in one embodiment, include four locations and are equally spaced at 90 degrees around the base 30. The receptacles 40 may be aligned with the sleeve holder 36 and adapter holder 38 in some embodiments. The receptacles 40 are not limited to being located or in the number depicted and could be arranged in other configurations. The base 30 may further include a plurality of holes 42 for receiving fasteners for passing through the base 30 and attaching to the mounting wall 20. The base 30 may also include apertures 44 for receiving one or more fasteners for mounting of the spindle 18 to the backplate 16.

Figure 4:
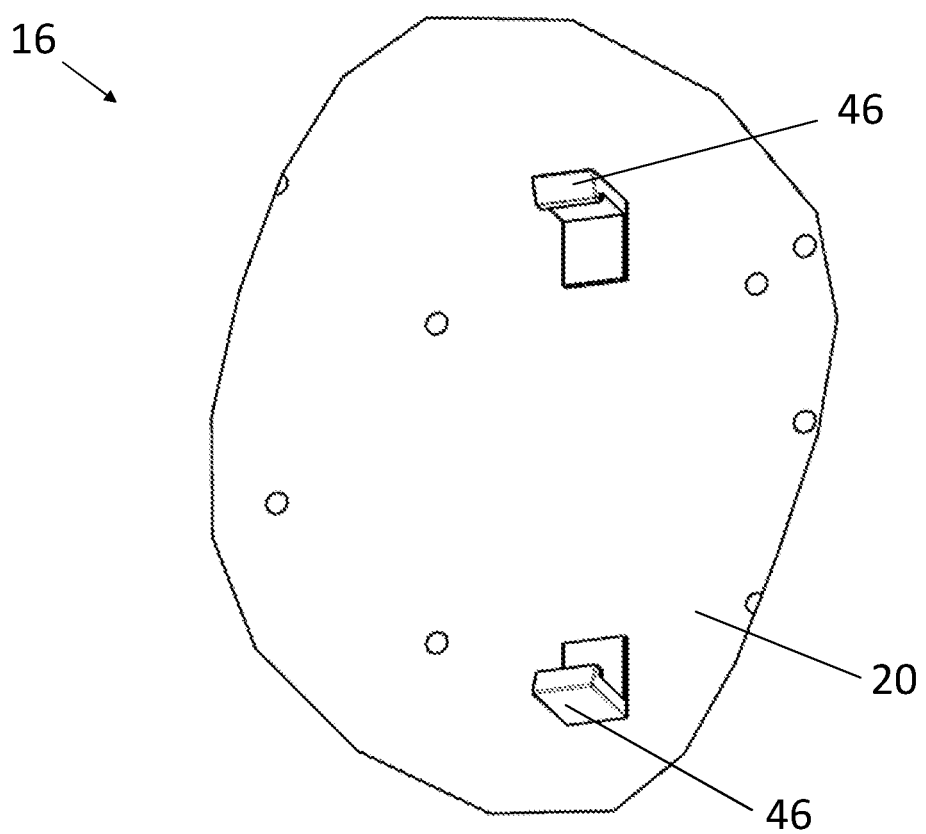
FIG. 4 is a close-up view of a mounting wall of the enclosure of FIGS. 1-2, according to aspects of the present disclosure.

FIG. 4 is a close-up view of the mounting wall 20 including a plurality of mounting clips 46 extending therefrom. The mounting clips 46 are configured to mate with the receptacles 40 of the backplate 16 for attaching the backplate 16 to the mounting wall 20. The mounting clips 46, in an embodiment, include two that are positioned opposing each other (e.g., 180 degrees apart) such that either set of two opposing receptacles 40 can be arranged to be connected to the mounting clips 46. Other embodiments may include other numbers or arrangements of mounting clips 46 for providing various position configurations for mounting the backplate 16.

Figure 5A:
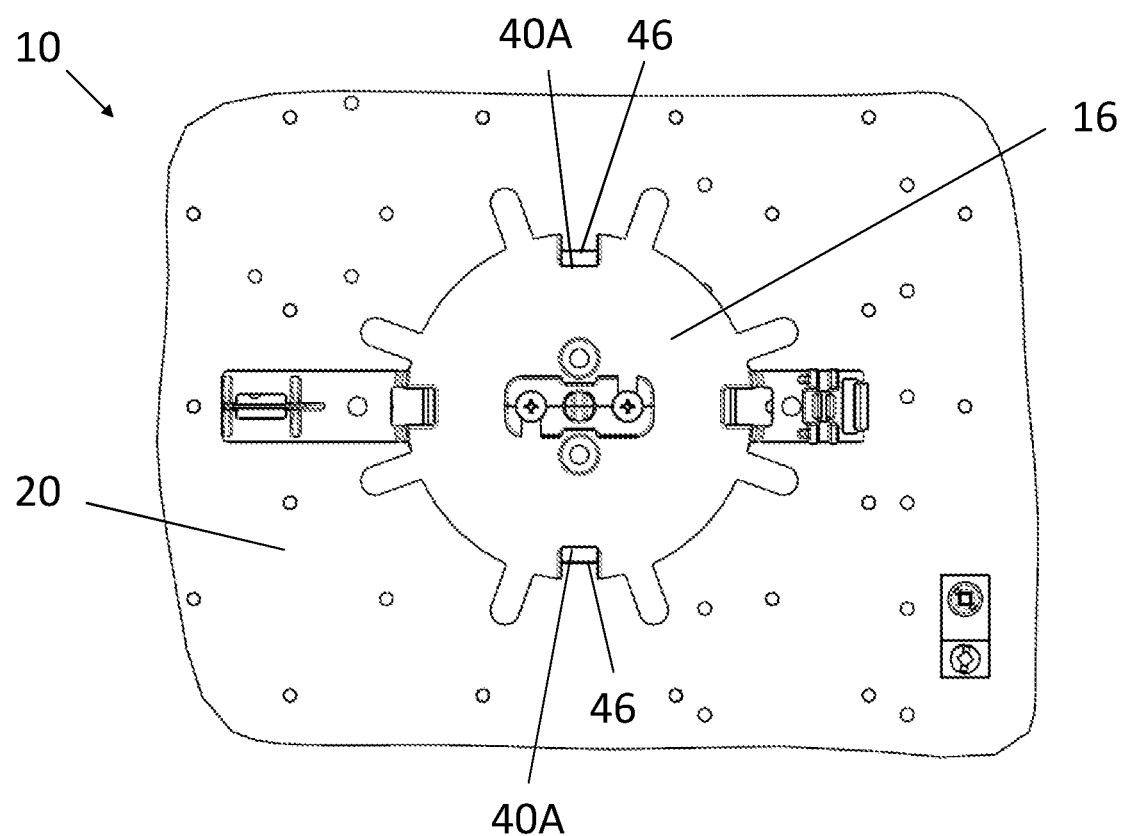
FIG. 5A is a top view of the backplate mounted in the enclosure in a first configuration, according to aspects of the present disclosure.
Figure 5B:
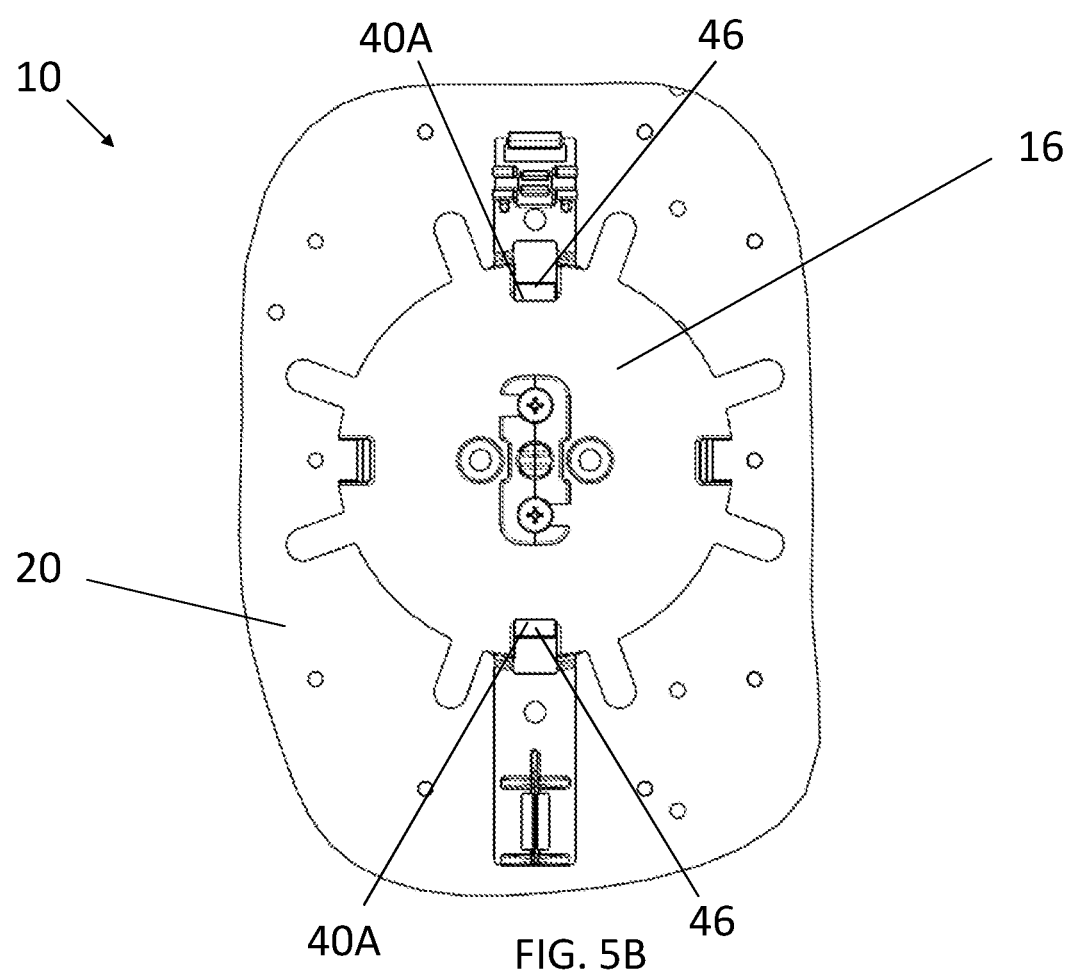
FIG. 5B is a top view of the backplate mounted in the enclosure in a second configuration, according to aspects of the present disclosure.

FIG. 5A is a front view of the backplate 16 being mounted in a first configuration in the housing 12 with a first set of receptacles 40A being connected to the mounting clips 46. In this configuration, the sleeve holder 36 and the adapter holder 38 extend along a first line within the housing. FIG. 5B is a front view of the backplate 16 being mounted in a second configuration in the housing 12 with a second set of receptacles 40B being connected to the mounting clips 46. In this configuration, the sleeve holder 36 and the adapter holder 38 extend along a second line within the housing, the second line being perpendicular to the first line. FIGS. 5A and 5B show two mounting configurations, but it should be understood that two additional mounting configurations are possible in this embodiment, by continuing to rotate the backplate 16 by 90 degrees within the housing (e.g., the reverse positions of the two configurations shown).

Figure 6:
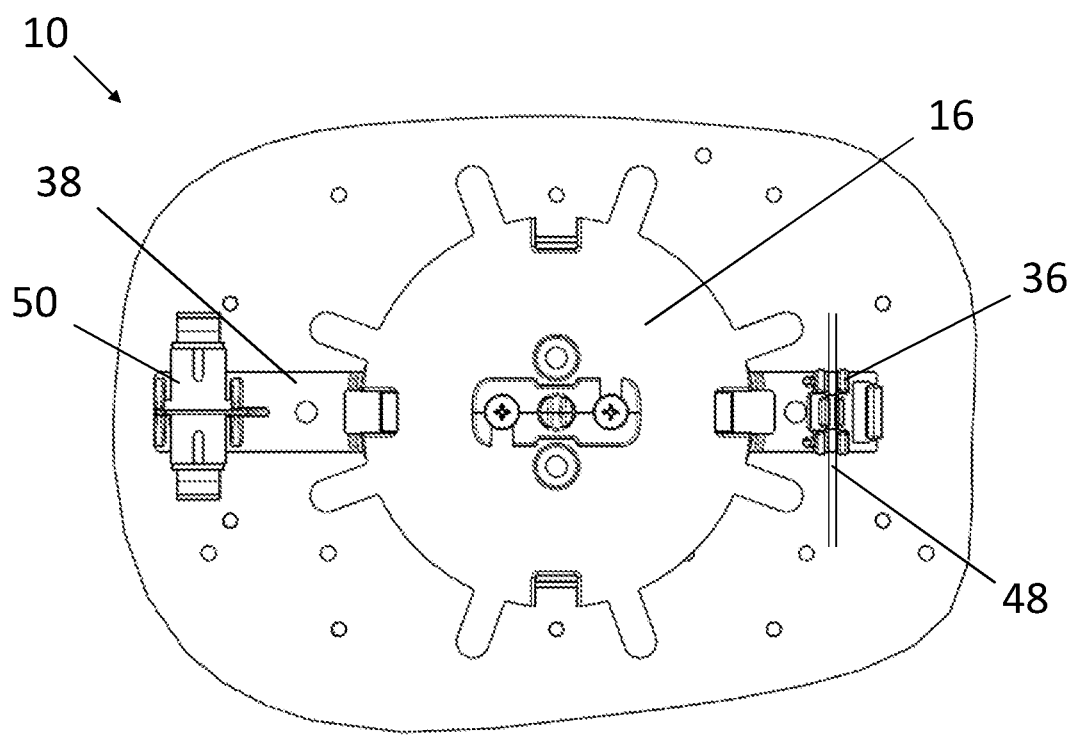
FIG. 6 is a top view of the backplate mounted in the enclosure and further including an adapter and a splice sleeve being held by the backplate, according to aspects of the present disclosure.

FIG. 6 is a front view of the first configuration of the backplate 16, further including a sleeve 48 in the sleeve holder 36 and an adapter 50 in the adapter holder 38. The sleeve 48 and the adapter 50 are securely fixed within the housing 12 via the sleeve holder 36 and the adapter holder 38, thereby providing effective and efficient routing and storage of cable within the enclosure 10.

Figure 7:
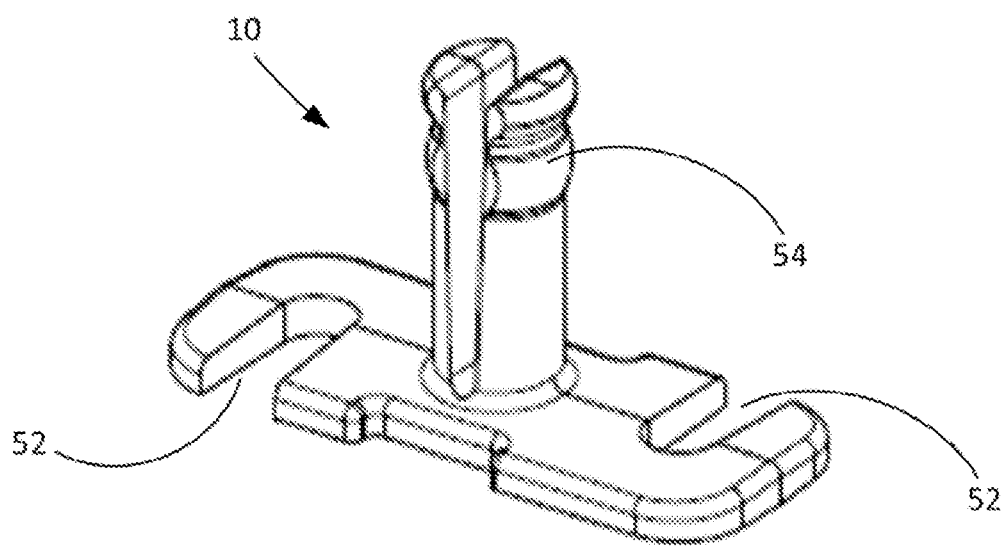
FIG. 7 is a perspective view of an exemplary spindle that may be used in conjunction with the backplate, according to aspects of the present disclosure.
Figure 8A:
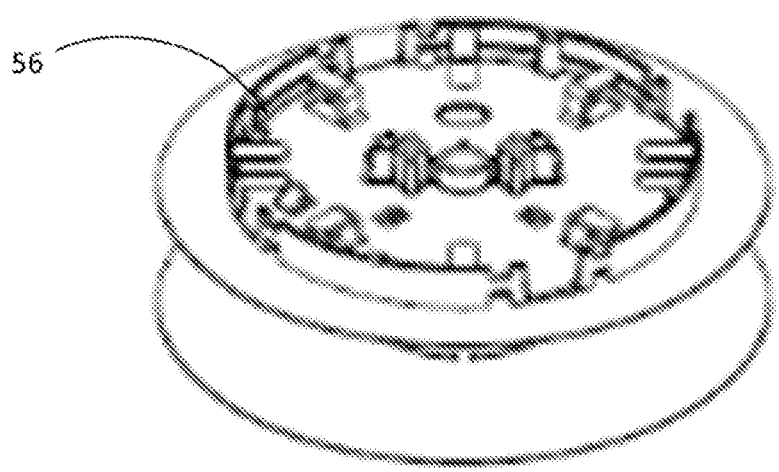
FIG. 8A is a first perspective view of an exemplary cable reel that may be used in conjunction with the backplate and spindle.
Figure 8B:
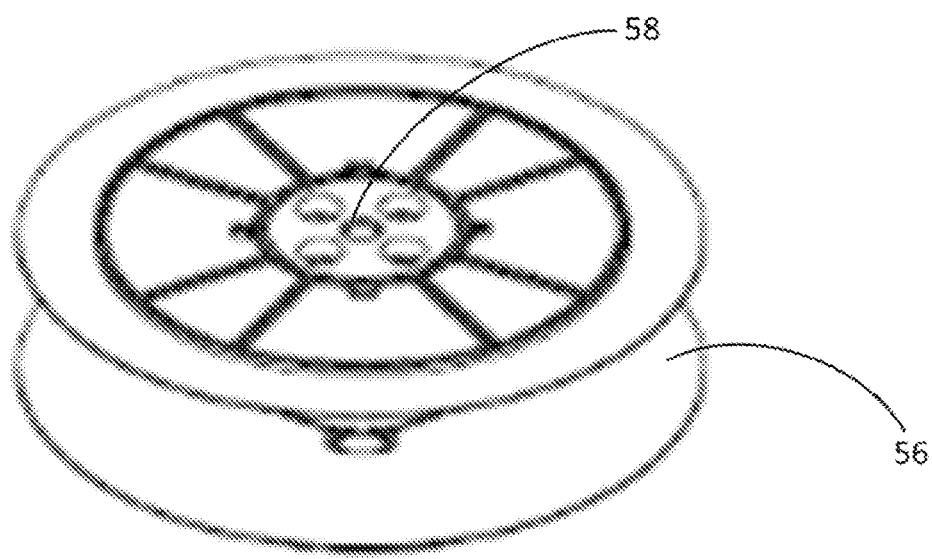
FIG. 8B is a second perspective view of the exemplary cable reel, according to aspects of the present disclosure.

FIG. 7 is a perspective view of the spindle 18, according to an embodiment. The spindle 18 may include one or more openings 52 for receiving a fastener for connected the spindle 18 to the mounting surface 32 of the backplate 16. The spindle 18 may also include a shaft 54 for receiving a spool. FIGS. 8A and 8B are perspective views of an exemplary spool 56 which may include an opening 58 for connecting the shaft 54 of the spindle 18.

The spool 56 may be configured to rotate so as to store excess optical fiber cable inside the enclosure 10. In some embodiments, the spool 56 holds up to 200 feet of 3 mm, 12 fiber micro cable. The spool 56 may also hold, for example, 125 feet of 4 mm, 24 fiber micro cable, or 100 feet of 5.5 mm OSP cable. The spindle 18 allows the spool 56 to rotate independently of the backplate 16. In various embodiments, the backplate 16 is stationary, and therefore does not move or pivot as the spool 56 rotates.

In some embodiments, the enclosure may provide 12 SC or 24 LC connections on the front of the spool and MPO, plug-and-play, SC/LC breakouts or pigtails on the back side of the spool. Various embodiments of the enclosure may provide fiber terminations that are Telcordia GR-326 compliant. Various embodiments may support all industry standard single mode and multi-mode connectors. Various embodiments of the enclosure have less than or equal to about 0.2 dB insertion loss, exceeding industry standards.

Various embodiments may be configured for both indoor and outdoor use. Embodiments of the optical fiber enclosure 10 may have the housing 12 and hinged cover 14, making it is easy for craft personnel to access the enclosure during both initial service installation and ongoing maintenance. Various embodiments of the enclosure may include a gasket seal for protection from elements. In various embodiments, the enclosure may have one or more sealed or sealable ports for protection from elements or operation in an outdoor environment. Some embodiments may be made of high-impact and flame retardant PVC for durability.

Various embodiments of the optical fiber enclosure may be configured for wall mounting. In some embodiments, the enclosure may include a security screw with the ability to secure with padlock.

Various embodiments of the optical fiber enclosures disclosed herein are designed to fast-track and simplify fiber installations when landing, for example, 12 to 24 fibers in any environment. Various embodiments have a compact design that efficiently uses available space. The compact design can be pre-configured to terminate, for example, up to 24 fibers. Various embodiments disclosed herein are simpler and easier to use than conventional enclosures. The disclosed backplate provides a spacer for the mounting of the spindle and the spool, such that an excess slack storage space is created. Moreover accessory holders, such as a sleeve holder and an adapter holder, may be conveniently positioned at different locations within the housing. The backplate may be stationary while enabling a rotating spool. The backplate may include quick connecter configurations, such as for clips and receptacles to quickly mount and/or remove the backplate.

Various embodiments of the optical fiber enclosure may be configured to accept a variety of drop cables. Various embodiments of the enclosure may be integrated into any network architecture and deployment. For example, the enclosure may be used in a fiber distribution system comprising one or more distribution terminals. In some embodiments, the fiber distribution system may comprise a plurality of distribution terminals arranged in a daisy chained configuration. A distribution terminal may have at least one feeder port and a plurality of distribution ports. Each of the at least one feeder port and the plurality of distribution ports may be sealable ports configured to receive a duct configured to receive pushable fiber therethrough or a connector, and the connector may be configured to interface with a drop type cable. The fiber distribution system may comprise an enclosure configured according to aspects of the present disclosure. The enclosure may be configured as a tap box for mounting at a user location. The enclosure may have at least one sealable port configured to receive one of a connector and a duct configured to receive pushable fiber therethrough, and may include a spool. In some embodiments, the sealable ports of the enclosure may further include anti-rotation locking features.

In some embodiments, the distribution terminal may be configured to receive a fiber through the feeder port and to output a plurality of fibers through the plurality of distribution ports of the terminal, at least one fiber of the plurality of fibers being received by the enclosure through the sealable port of the enclosure.

In some embodiments, the terminal may be configured to receive a plurality of swappable modules. In some embodiments, the module may be configured to receive different types of splitters having different split ratios. In some embodiments, the module may be configured to receive any optical component, including any type of connector.

In some embodiments, the enclosure may comprise a single spool. In other embodiments, the enclosure may comprise a plurality of spools. The plurality of spools may be stackable and configured to provide slack storage, for example, of about 600 feet. The plurality of spools may be configured to rotate independently of the backplate.

The fiber distribution system may further comprise a plurality of connectors. The connectors may be configured to couple with a plurality of distribution ports of the distribution terminal. The adapter plate of the enclosure may be configured to receive the connectors. In some embodiments, each connector of the plurality of connectors may be configured to receive epoxy so as to provide a hardened connector.

In some embodiments, the enclosure may comprise a mount configured to attach the enclosure to a user location. The enclosure may comprise at least one sealable port configured to receive one of a connector and a duct configured to receive pushable fiber therethrough. The enclosure may comprise at least one port configured to provide a drop cable to the user location, and at least one spool. In some embodiments, the enclosure may be configured to provide a plurality of different types of drop cables.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber enclosure, comprising:
   a housing comprising a mounting wall within a storage space;
   a backplate attached to the mounting wall, the backplate comprising a mounting surface and a circumferential wall for receiving cable slack, wherein the backplate further comprises a first accessory holder extending away from a cylindrical base at a first radial location and a second accessory holder extending away from the cylindrical base at a second radial location; and a spindle attached to the mounting surface of the backplate, the spindle configured to connect to a cable spool configured to rotate relative to the spindle and the backplate to store optical fiber.

2. The optical fiber enclosure of claim 1, wherein the backplate comprises the cylindrical base comprising the mounting surface and the circumferential wall.

3. The optical fiber enclosure of claim 2, wherein the backplate further comprises one or more accessory holders extending away from the cylindrical base.

4. The optical fiber enclosure of claim 3, wherein the one or more accessory holders comprise a sleeve holder and an adapter holder.

5. The optical fiber enclosure of claim 1, wherein the first radial location and the second radial location are separated from each other by 180 degrees.

6. The optical fiber enclosure of claim 2, wherein the backplate further comprises a plurality of protrusions extending from the cylindrical base, the plurality of protrusions retaining a cable slack wrapped around the circumferential wall.

7. The optical fiber enclosure of claim 6, wherein the plurality of protrusions are coplanar with the mounting surface.

8. The optical fiber enclosure of claim 2, wherein the cylindrical base further comprises a plurality of first attachment features for mating with second attachment features on the mounting wall of the housing.

9. The optical fiber enclosure of claim 8, wherein the first attachment features are receptacles or mounting clips and the second attachment features are receptacles or mounting clips.

10. The optical fiber enclosure of claim 8, comprising more first mounting features than second mounting features.

11. The optical fiber enclosure of claim 8, wherein the first mounting features are spaced at different radial locations along the circumferential wall.

12. The optical fiber enclosure of claim 11, wherein the backplate is configured to be mounted in a plurality of orientations within the housing via a selected two of the first attachment features and the second attachment features.

13. The optical fiber enclosure of claim 1, further comprising a hinged cover for closing the storage space.

14. The optical fiber enclosure of claim 1, further comprising the cable spool mounted to the spindle.

* * * * *